F. H. JONES.
TRANSMISSION GEARING.
APPLICATION FILED FEB. 3, 1910.

991,318.

Patented May 2, 1911.
3 SHEETS—SHEET 1.

Witnesses
Frank A. Fahle
Thomas W. McMeans

Inventor
Frank H. Jones,
By Bradford & Hood.
Attorneys

F. H. JONES.
TRANSMISSION GEARING.
APPLICATION FILED FEB. 3, 1910.

991,318.

Patented May 2, 1911.
3 SHEETS—SHEET 2.

Witnesses
Frank A. Fahle
Thomas W. McMeans

Inventor
Frank H. Jones,
By Bradford Hood
Attorneys

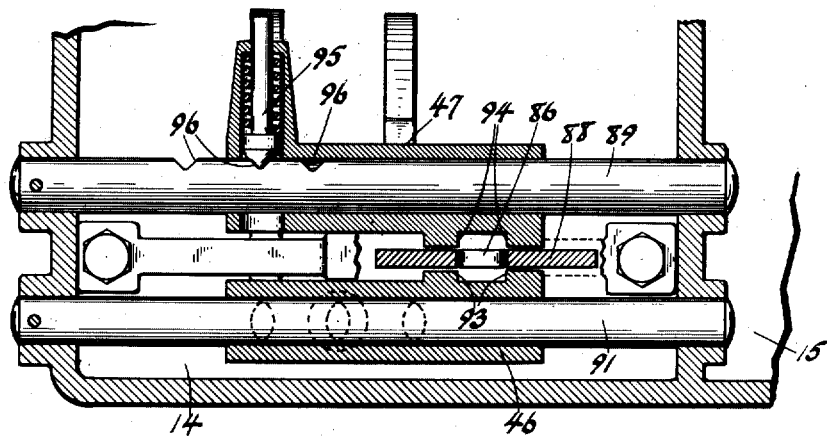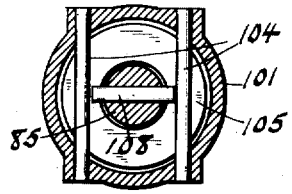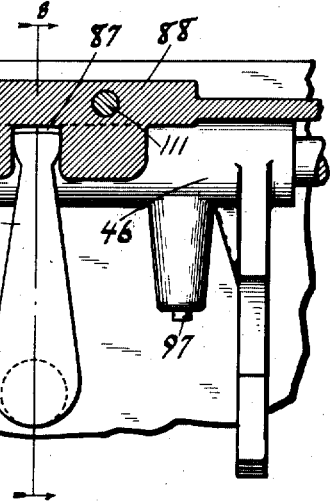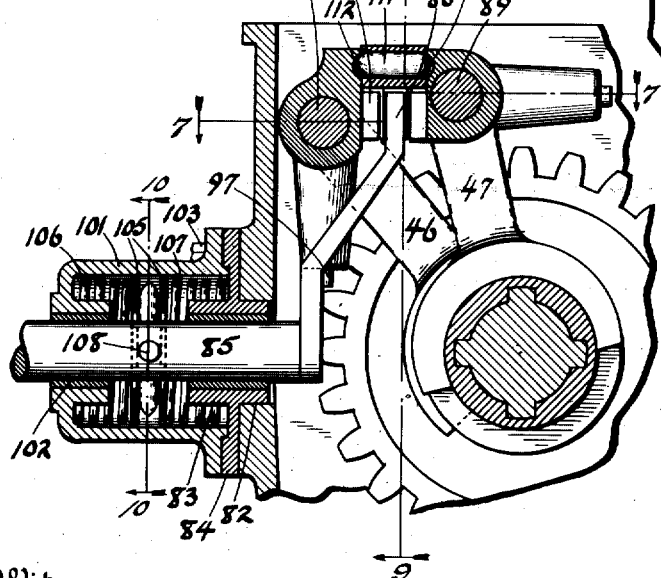

UNITED STATES PATENT OFFICE.

FRANK H. JONES, OF MUNCIE, INDIANA, ASSIGNOR TO WARNER GEAR COMPANY, OF MUNCIE, INDIANA, A CORPORATION OF INDIANA.

TRANSMISSION-GEARING.

991,318.    Specification of Letters Patent.    Patented May 2, 1911.

Application filed February 3, 1910. Serial No. 541,781.

*To all whom it may concern:*

Be it known that I, FRANK H. JONES, a citizen of the United States, residing at Muncie, in the county of Delaware and State of Indiana, have invented a certain new and useful Transmission-Gearing, of which the following is a specification.

In automobiles driven by internal combustion engines it is necessary to provide, between the engine and the driving wheels, a clutch and a speed-varying transmission gearing by means of which a driving connection between the motor and the driving wheels may be readily established and disestablished, and by means of which the speed relation between the motor and driving wheels may be varied. Where the speed varying gearing is of the sliding gear or selective gear type, as distinguished from the planetary gear type, the clutch is practically required to be of a friction type and consequently a lubricant needs to be supplied to the clutch. The gearing needs also to be lubricated but the lubricant which is best adapted for use with the gearing is very far from the best lubricant for the clutch. It is also desirable that the clutch and the gearing be as intimately associated as possible and that both structures be, if possible, arranged with dust excluding protective casings.

The object of my present invention is therefore, to produce a neat, compact and efficient structure embodying both the speed-varying transmission gearing and the clutch mechanism and of such character that the clutch mechanism and speed-varying gearing may be independently provided with proper lubricants.

A further object of my invention is to provide means for controlling the gear shifting members in such manner as to prevent improper intermeshing of the gears.

A further object of my invention is to provide such improvement in details of construction as shall be hereinafter pointed out.

The accompanying drawings illustrate my invention as embodied in a structure of a sliding gear type.

Figure 1:
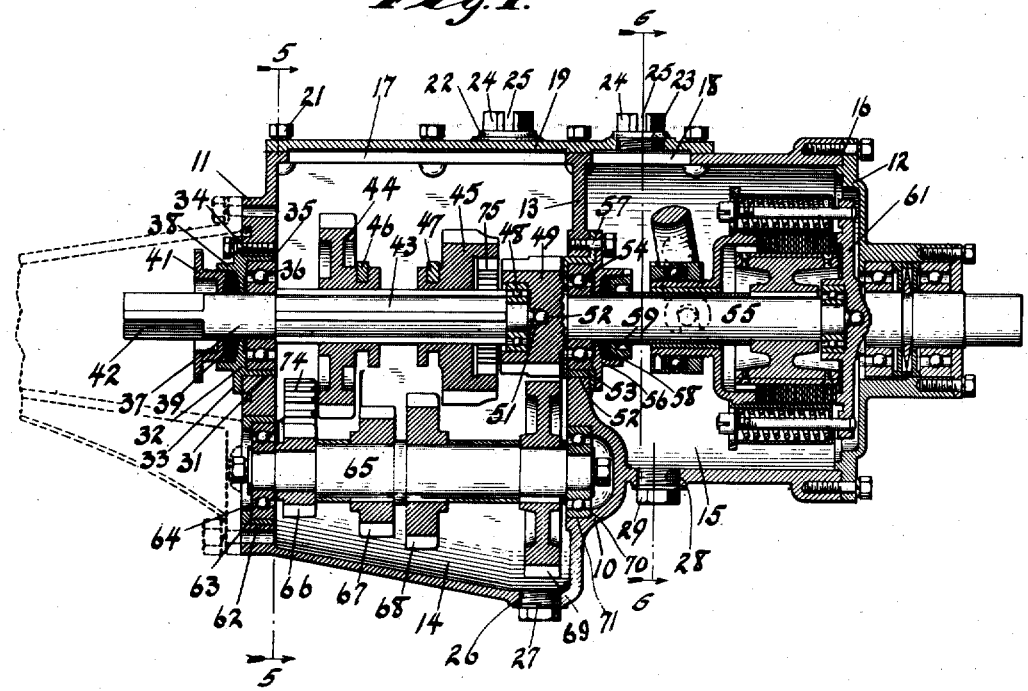
Figure 2:
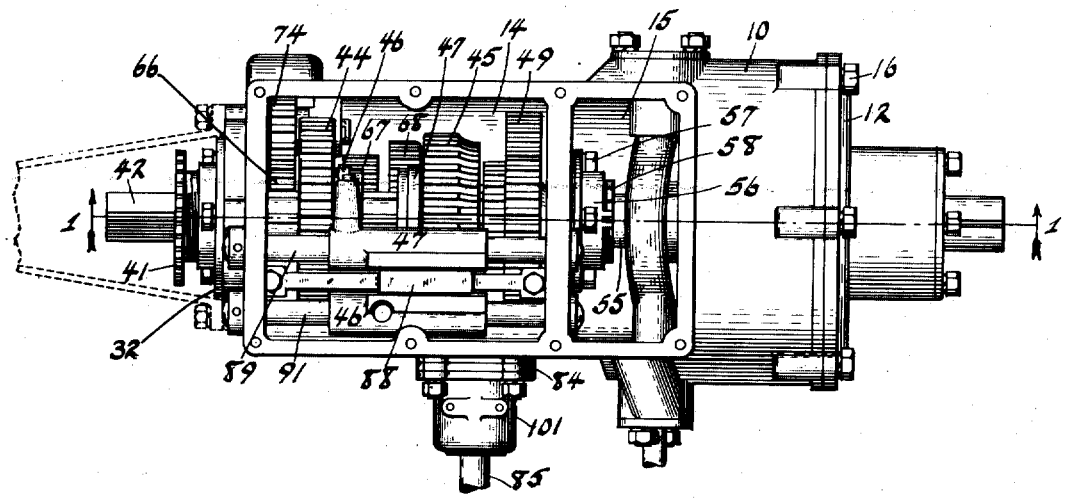
Figure 3:
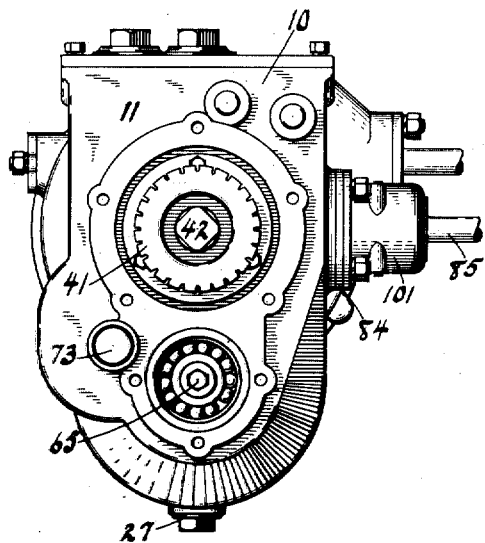
Figure 4:
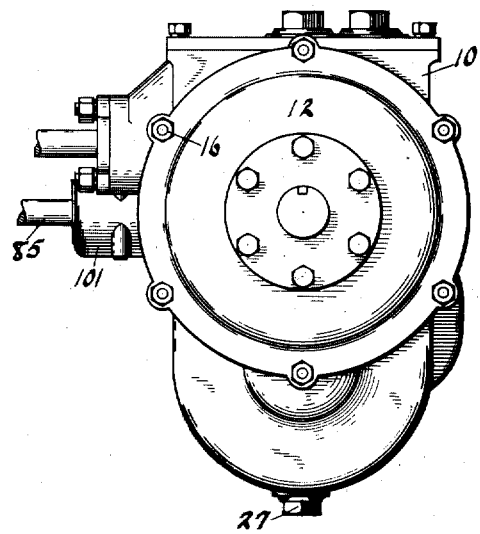
Figure 5:
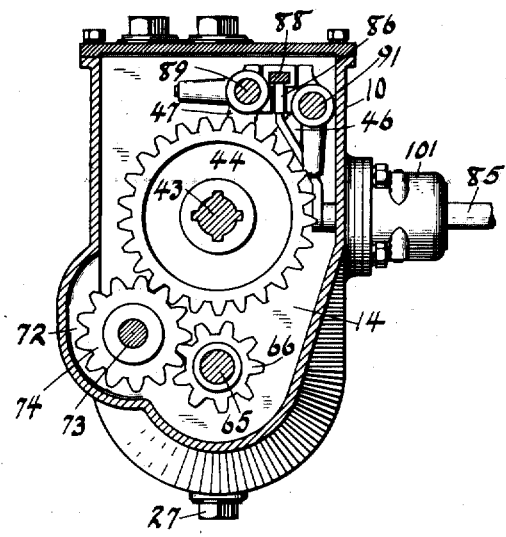
Figure 6:
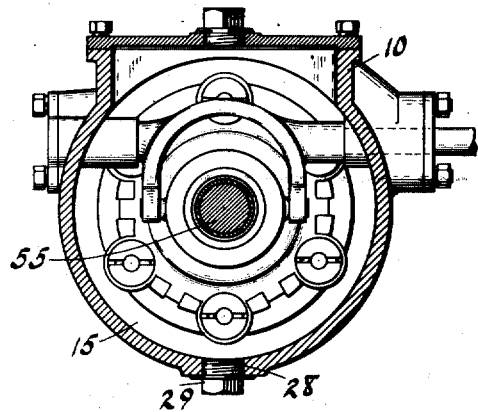

Figure 1 is an axial section on line 1—1 of Fig. 2; Fig. 2 a plan with the cover of the protective casing removed; Fig. 3 an elevation of the transmitting end of the structure; Fig. 4 an elevation of the receiving end; Fig. 5 a section on line 5—5 of Fig. 1; Fig. 6 a section on line 6—6 of Fig. 1; Fig. 7 a section on line 7—7 of Fig. 8; Fig. 8 a section on line 8—8 of Fig. 9; Fig. 9 a section on line 9—9 of Fig. 8, and Fig. 10 a section on line 10—10 of Fig. 8.

In the drawings, 10 indicates an inclosing protective casing having end walls 11 and 12 and an intermediate partition 13 which thus divides the casing into the gearing chamber 14 and a clutch chamber 15. It is convenient to make all of the parts above mentioned integral except the end wall 12, which, for reasons which will appear, is better formed as a removable member held in place by bolts 16. Access is had to the chamber 14 through an opening 17 in the upper side of the casing such opening being preferably substantially the full size of the chamber. Access is had to chamber 15 through an opening 18 which need not be the full size of the chamber. The two openings 17 and 18 are closed by a suitable closure or closures, preferably a single cover plate 19 held in place by removable nuts or bolts 21. In order to afford ready introduction of lubricant into the chambers 14 and 15 I provide removable plugs 22 and 23 respectively which are threaded into suitable openings formed through the cover plate 19. In order that either of these plugs may be readily removed even in the absence of special tools, I provide each of said plugs with a polygonal outer head 24 shaped to receive an ordinary monkey wrench, and also formed in each of said heads a diametrical slot 25 in which may be placed any bar for use as a lever.

Formed through head 11 is an opening 31 within which is mounted a bearing cup 32 having a portion fitting opening 31 and also having a flange 33 adapted to seat on the outer face of wall 11, bolts 34 being provided to firmly hold the cup in place. Formed in that portion of the cup which lies within wall 11, is a pocket 35 adapted to receive the outer race of a ball bearing 36, the inner race of said bearing receiving a shaft 37. Formed in the outer end of cup 32 is a threaded pocket 38 adapted to receive a packing 39 and a gland 41. The outer end 42 of shaft 37, which projects beyond gland 41, is squared or otherwise suitably formed to receive a connection with a driven member.

The intermediate portion 43 of shaft 37 is given a suitable polygonal form so as to receive, for rotation therewith, sliding gears 44 and 45 which, in the form shown in the drawings, are adapted to be independently shifted by shifting yokes 46 and 47 respectively. The inner end of shaft 37 is reduced so as to receive the inner race of a ball bearing 48 the outer race of which is nested within the gear and clutch 49. Formed in the axis of the gear and clutch 49 is a ball pocket 51 in which is mounted a ball 52 against which the inner end of shaft 37 abuts, as clearly shown in Fig. 1.

Formed through partition 13, in alinement with opening 31, is an opening 52 in which is mounted a bearing cup 53, preferably having a Z-shaped cross section so that one arm of the Z will engage the partition while the other arm will serve as a seat for the outer race of a ball bearing 54. The inner race of bearing 54 receives a shaft 55 which is in alinement with shaft 37 and which may very conveniently be formed integrally with the clutch and gear 49. Seated upon cup 53 is a packing cup 56 which surrounds shaft 55 and is held in place by the bolts 57 which also hold the cup 53 in place. Cup 56 is adapted to receive a packing 58 which will surround shaft 55 and prevent the flow of lubricant from chamber 15 into chamber 14 or from chamber 14 into chamber 15, the packing being held in place by a suitable gland 59. Shaft 55 is connected to a friction clutch 61 of a desired type.

Formed through wall 11 below opening 31 is an opening 62 in which is mounted a cup 63 which receives the outer race of a ball bearing 64, the inner race of said bearing receiving the outer end of a countershaft 65. Shaft 65 carries four gears 66, 67, 68 and 69, the purpose of which will appear, the gear 66 being somewhat less in diameter than the diameter of hole 62. At its inner end shaft 65 is supported by the inner race of a ball bearing 70 the outer race of which is received in a pocket 71 formed in partition 13, said pocket however having no communication with chamber 15. Formed in the side wall of chamber 15, to one side of shaft 65, is a pocket 72 and projected into the axis of this pocket is a stud 73 upon which is journaled a reversing gear 74, said gear being in continuous mesh with gear 66 and being so arranged that gear 44, when shifted in one direction (to the left in Fig. 1) will come into mesh with the gear 74. Gear 67 lies a distance from gear 66 equal to a little more than the width of gear 44 and is of a size to permit gear 44 to mesh therewith when shifted in one direction (to the right in Fig. 1). Gear 68 is adapted to receive gear 45 which is provided with internal clutch teeth 75 formed to receive the adjacent ends of the teeth of the clutch and gear 49, the gear teeth of which are constantly in mesh with gear 69.

It will be noticed that the structure here shown is very compact and must be disassembled and assembled in a certain order. Referring to Fig. 1 a disassemblage of the parts will be accomplished as follows: Cap 19 is removed and the bolts 34 withdrawn. Thereupon cup 32, bearing 36 and shaft 37 may be withdrawn outwardly away from the gears 44 and 45 and said gears may be withdrawn through opening 17. Bolts 16 may then be withdrawn and the entire clutch mechanism including the clutch and gear 49, withdrawn with cover 12, the clutch and gear 49 passing through opening 43 which is just large enough to permit such movement. Stud 73 may be then withdrawn so as to permit the removal of gear 74 and shaft 65 then shifted to the left, and cup 63 withdrawn thus permitting the shaft 65, with its attached gears, to be tilted within chamber 14 and withdrawn through opening 17. Cup 63 is held in place by the casing 81 which, in the present instance, is shown as of a form capable of inclosing a driven shaft connected to end 42 of shaft 37.

In order to shift gears 44 and 45 in either direction from their neutral positions shown in Fig. 1, and at the same time prevent any possibility of improper movement of said gears so as to cause locking of the train, I provide the following mechanism. Formed through one side of wall of chamber 14 is an opening 82 in which is mounted a bearing sleeve 83 having a circumferential flange 84. Journaled in the bearing sleeve 83 is a rock shaft 85 which carries a shifting arm 86 at its inner end. The upper end of the shifting arm 86 lies in a notch 87 of a fixed bar 88 mounted in chamber 14. Arranged alongside of bar 88 are two rods 89 and 91. Slidably mounted on rod 89 is the yoke 47 and slidably mounted on rod 91 is the yoke 46. Yoke 46 is provided with a pair of fingers 93 which lie alongside bar 88 and between which the upper end of arm 86 may be projected. Similarly, yoke 47 is provided with a pair of fingers 94 between which the upper end of arm 86 may be projected. In order to serve as an indication of the position of the yoke 47, I provide a spring pressed latch 95 which is adapted to seat in any one of a series of notches 96 formed in rod 89. Similarly, yoke 46 is provided with a spring latch 97 which is adapted to seat in notches formed in rod 91, as indicated in dotted lines in Fig. 7.

In order to normally keep the upper end of arm 86 in the notch 87 I provide a spring cup 101 which is sleeved over shaft 85 and is provided with a bearing 104. Cup 101 is adapted to fit upon flange 84 so that a single set of bolts 103 will serve to hold both the cup and the bearing 83 in place. Extending transversely through sleeve 101 are two cross bars 104, 104 against the opposite sides of which are arranged two washers 105, 105 which are held normally against the cross bars 104 by springs 106 and 107. Extending through shaft 85 between the two washers 105, and in the plane of the cross bars 104, is a pin 108 adapted to engage either one of said washers and move the same against the action of its spring. By this arrangement it will be seen that shaft 85 will be normally held in the neutral axial position shown in Fig. 8 but it may be readily shifted either to the right or left so as to shift the upper end of lever 86 out of the notch 87 and in between either fingers 93 or 94 so that, by a movement of said arm in either direction, by an oscillation of shaft 85, the yokes 46 and 47 may be independently shifted so as to shift the gears 44 and 45. In order to prevent a movement of either of said yokes when the other has been shifted from its normal position I mount, in bar 88, a transversely shifting locking pin 111 having rounded ends adapted to fit in pockets 112 or 113 formed in the yokes 46 and 47 respectively, the pin 111 being of such length that either of said yokes is free to move, but when so moved, the locking pin will be projected into the pocket of the other yoke so as to prevent movement thereof, in a well known manner.

I claim as my invention:

1. A speed-varying power-transmission gearing comprising a main casing divided by an intermediate partition into non-communicating oil-retaining chambers, a shaft passing through said partition, a lubricant-tight packing surrounding said shaft to prevent passage of lubricant from one chamber into the other, a friction clutch mounted in one of said chambers and connected to said shaft, and speed-varying transmission gearing mounted in the other of said chambers and connected to said shaft.

2. A power-transmitting speed-varying gear comprising a main casing, speed-varying transmission gearing mounted in said casing and comprising two independently slidable gears, a rock-shaft journaled in said casing, a shifting arm carried by the inner end of said rock-shaft, a stationary bar mounted in the casing and having a transverse notch in which the inner end of the shifting lever normally lies, a pair of guide bars mounted one upon each side of said stationary bar, and a pair of shifting yokes each mounted on one of said pair of guide bars and arranged upon opposite sides of said shifting lever alongside said bar on opposite sides thereof and each provided with a notch formed to receive the inner end of the shifting lever.

3. A power-transmitting speed-varying gear comprising a main casing, speed-varying transmission gearing mounted in said casing and comprising two independently slidable gears, a rock-shaft journaled in said casing, a bearing sleeve secured to said casing and supporting said shaft, a spring cup surrounding said shaft and engaging said bearing sleeve, two oppositely acting compression springs mounted in said spring cup, two washers mounted in said spring cup between the ends of said springs, abutments carried by the spring cup for limiting the movement of said washers toward each other, an abutment carried by the oscillating shaft between and engaging the said two washers, a shifting arm carried by the inner end of said rock-shaft, a bar mounted in the casing and having a transverse notch in which the inner end of the shifting lever normally lies, and a pair of shifting yokes arranged upon opposite sides of said shifting lever and each provided with a notch formed to receive the inner end of the shifting lever.

4. A power-transmitting speed-varying gearing comprising a main casing, speed-varying transmission gearing mounted in said casing and comprising two independently slidable gears, a rock-shaft journaled in said casing, a shifting arm carried by the inner end of said rock-shaft, a bar mounted in the casing and having a transverse notch in which the inner end of the shifting lever normally lies, a pair of shifting yokes arranged upon opposite sides of said shifting lever and each provided with a notch formed to receive the inner end of the shifting lever, a pair of springs acting in opposite directions longitudinal of the rock shaft, and a projection carried by said rock shaft and lying between the springs whereby the springs normally serve to keep the end of the shifting lever in the notch in said bar.

5. A power-transmitting speed-varying gearing comprising a main casing, speed-varying transmission gearing mounted in said casing and comprising two independently slidable gears, two shifting members each connected to one of said slidable gears, a rock shaft journaled in the casing on an axis substantially at right angles to the line of movement of said shifting members, a lever carried by said rock shaft and adapted to be carried by an axial movement of the rock shaft into an engagement with one or the other of said shifting members, a spring case secured to the main casing and surrounding the rock shaft, a pair of compression springs mounted in said spring case, and a projection carried by the rock shaft between said compression springs for the purpose set forth.

In witness whereof, I, have hereunto set my hand and seal at Muncie, Indiana, this twenty-first day of January, A. D. one thousand nine hundred and ten.

FRANK H. JONES. [L. S.]

Witnesses:
C. E. DAVIS,
W. H. CHURCH.